United States Patent [19]

Hugl et al.

[11] 4,132,840
[45] Jan. 2, 1979

[54] PROCESS FOR COLORING POLYURETHANE FOAMS

[75] Inventors: Herbert Hugl; Gerhard Wolfrum, both of Leverkusen, Germany

[73] Assignee: Bayer Aktiengesellschaft, Leverkusen, Germany

[21] Appl. No.: 703,855

[22] Filed: Jul. 9, 1976

[30] Foreign Application Priority Data

Jul. 10, 1975 [DE] Fed. Rep. of Germany ....... 2530809

[51] Int. Cl.$^2$ .................. C08G 18/14; C08G 18/38
[52] U.S. Cl. ......................................... 521/167; 8/4;
8/178 E; 8/DIG. 7; 252/182; 260/37 N;
427/195; 427/243; 427/385 R; 428/306;
428/425; 521/51; 521/919; 521/920
[58] Field of Search ................. 260/2.5 AQ, 77.5 AQ,
260/37 N; 8/4, 178 E, DIG. 7

[56] References Cited

U.S. PATENT DOCUMENTS

| | | | |
|---|---|---|---|
| 2,206,108 | 7/1940 | Mueller et al. | 260/465 |
| 2,798,090 | 7/1957 | Krell et al. | 260/509 |
| 3,137,671 | 6/1964 | Bosshard et al. | 260/37 |
| 3,326,960 | 6/1967 | Weaver et al. | 260/465 |
| 3,928,292 | 12/1975 | Maeda et al. | 8/4 |
| 3,970,601 | 7/1976 | Weber et al. | 8/178 E |

OTHER PUBLICATIONS

Venkataraman–Chemistry of Synthetic Dyes, vol. III, Academic Press, N.Y., (1970), pp. 449–452.
Griffiths–Colour & Constitution of Organic Molecules, Academic Press, N.Y., (1976), pp. 169–171.

*Primary Examiner*—H. S. Cockeram
*Attorney, Agent, or Firm*—Plumley and Tyner

[57] ABSTRACT

Polyurethane plastics are dyed with dyestuffs of the formula

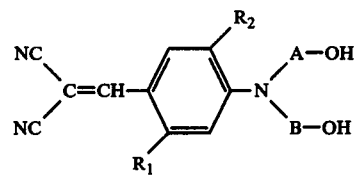

wherein $R_1$ denotes hydrogen, halogen, optionally substituted $C_1$–$C_4$-alkyl, optionally substituted $C_1$–$C_4$-alkoxy and optionally substituted $C_1$–$C_4$-alkylcarbonylamino and $R_2$ denotes hydrogen, optinally substituted $C_1$–$C_4$-alkyl and optionally substituted $C_1$–$C_4$-alkoxy, while A and B denote optionally branched alkylene chains which can be identical or different and preferably have 2 to 6 carbon atoms, with formation of covalent bonds, in that the dyestuffs are added before or during the polyaddition reaction to the reacton mixture of polyol and polyisocyanate or to one of the components.

2 Claims, No Drawings

PROCESS FOR COLORING POLYURETHANE FOAMS

The subject of the invention is a process for colouring polyurethane plastics with dyestuffs which are suitable for incorporation into the plastic, with formation of covalent bonds, characterised in that before or during the polyaddition reaction dyestuffs of the formula

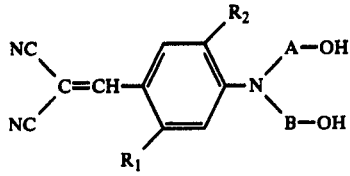

are added to the reaction mixture of polyol and polyisocyanate, or to one of the components, and the polyaddition is then carried out, or completed.

In the formula (I)
$R_1$ denotes hydrogen, halogen, optionally substituted $C_1$–$C_4$-alkyl, optionally substituted $C_1$–$C_4$-alkoxy and optionally substituted $C_1$–$C_4$-alkylcarbonylamino and $R_2$ denotes hydrogen, optionally substituted $C_1$–$C_4$-alkyl and optionally substituted $C_1$–$C_4$-alkoxy,
whilst
A and B denote optionally branched alkylene chains which can be identical or different and preferably have 2 to 6 carbon atoms.

By optionally substituted $C_1$–$C_4$-alkyl and optionally substituted $C_1$–$C_4$-alkoxy there are in particular understood radicals which are straight-chain or branched and can be, for example, substituted by hydroxyl or halogen.

Particularly suitable radicals $R_1$ are hydrogen, methyl, ethyl, methoxy, ethoxy, chlorine, bromine and acetylamino.

Particularly suitable radicals $R_2$ are hydrogen, methyl, ethyl, propyl, methoxy and ethoxy. A and B preferably denote ethylene, trimethylene and tetramethylene radicals. Dyestuffs of the formula (I) are known, for example, from U.S. Pat. Nos. 2,206,108 and 2,798,090. However, they have not hitherto been used for incorporation into polyurethane plastics.

The polyurethane plastics to be dyed in accordance with the process of the invention can be used for a great diversity of applications, for example as mouldings, sheets, fibres, foams, lacquers and coating materials.

In addition to the characteristic urethane groupings, the polyurethanes can also contain yet other functional groups, such as amide, urea or carbodiimide groups, in the macromolecule.

The process according to the invention is carried out by adding the dyestuff of the formula (I), in a suitable form, either to the polyol or polyisocyanate component or to the reaction mixture, before or during the formation of the polyurethane. The further reaction is carried out in the usual manner, that is to say as for non-coloured polyurethane plastics. Data relating thereto are to be found in the relevant specialist literature.

The dyestuffs can be added in bulk, as dyestuff powders, but more appropriately as a solution or dispersion in a suitable solvent or dispersing medium.

For the preparation of foam, solutions or dispersions in high-boiling organic liquids, for example aliphatic or aromatic esters of phosphoric acid, phosphonic acid, phthalic acid or adipic acid, such as diphenyl isopropyl phosphate, diphenyl cresyl phosphate, diphenyl octyl phosphate, trichloroethyl phosphate and tributyl phosphate, or dioctyl phthalate, butyl benzyl phthalate and dibutyl phthalate or dioctyl adipate and octyl benzyl adipate, lactones, for example butyrolacetone, alcohols, especially liquid polyalcohols, for example octaethylene glycol, or condensation products of adipic acid and 1,3-butanediol or 1,2-propylene glycol, ketones or ethers with boiling points above 180° C. and vapour pressures of less than 1 mbar at 20° C. have proved particularly suitable.

The polyurethane foams coloured in this way can be soft foams, semi-rigid foams or rigid foams and also so-called polyurethane integral skin foams.

Polyurethane thermoplastics which are coloured with the dyestuffs to be used according to the invention and which can be employed for the manufacture of shaped articles by injection moulding, extrusion or calendering are obtained by adding the dyestuff, dissolved or dispersed in a polyol or in a diol used as a chain lengthener, to the reaction mixture or to one of the components, preferably to the polyol compound.

Polyols which can be used are both polyesters containing hydroxyl groups, especially reaction products of dihydric alcohols with dibasic carboxylic acids, and polyethers containing hydroxyl groups, especially addition products of ethylene oxide, propylene oxide, styrene oxide or epichlorohydrin with water, alcohols or amines, preferably dialcohols.

Examples of chain-lengthening diols are ethylene glycol, diethylene glycol, butanediol, hexanediol, octanediol and hydroquinone β-dihydroxyethyl ether.

If monoalcohols or monoamines are also used for the manufacture of the thermoplastic polyurethane, the dyestuff can also be dissolved or dispersed in these reagents. Examples of monoalcohols which can be used are hexanol, octanol, nonyl alcohol or isooctanol.

The dyestuffs (I) are furthermore suitable for colouring polyurethane systems for textile coating. The coloured polyurethanes can be used as powders, solutions or dispersions. Chemical and technological details may be found in the specialist literature, for example Melliand Textilberichte 53, 1272-1277 (1972); 52, 1094-1099 (1971); 51, 1313-1317 (1970).

In the case of coating powders, the dyestuff to be used according to the invention is most suitably dispersed in the polyol component before a prepolymer is prepared by reaction with a diisocyanate, this prepolymer being reacted with a diamine in the last stage, so as to undergo chain lengthening and give a coloured free-flowing thermoplastic polyurethane powder.

In the case of the solutions of the one-component polyurethane coating compositions and in the case of the aqueous dispersions, the dyestuff is most simply added to the polyol component, when manufacturing the polyurethane, and is incorporated into the polyurethane molecule during the reaction with the diisocyanate. In the case of two-component polyurethane textile coating compositions the dyestuff can either be incorporated into the crosslinkable polyurethane or be admixed as a paste, dispersed in a suitable medium, for example a solution of a polyester-polyurethane in methyl ethyl glycol/toluene, to the crosslinkable polyurethane, the incorporation of the dyestuff taking place in the last reaction stage during the reaction with a diisocyanate.

Polyurethane elastomers from which elastomer filaments can be manufactured in accordance with customary processes can be coloured with dyestuffs of the formula (I).

For this purpose, the dyestuff is finely distributed in the dihydroxy component before a prepolymer containing NCO groups, in which the dyestuff is incorporated with formation of chemical bonds, is prepared by reaction with a diisocyanate.

By reaction with a diamine, serving as a chain lengthener, in solution, the prepolymer is converted to a polyurethane elastomer solution which can be converted to filaments by the dry spinning process or wet spinning process but can also be converted to films by spreading the elastomer solution on glass plates and allowing the solution to dry, for example for 30 minutes at 70° C. and 45 minutes at 100° C.

Details regarding the preparation of polyurethane elastomer solutions can be found, for example, in German Offenlegungsschrift (German Published Specification) 1,962,602.

The colouring of polyurethane lacquers with dyestuffs of the formula (I) is suitably carried out by dissolving the dyestuff in the solution which contains the polyisocyanate component and polyol component. The coloured lacquer is then applied to the surface to be lacquered and is stoved, for example, for 30 minutes at 180° C. The dyestuff is found to be incorporated in a form which is very fast to cross-lacquering and to bleeding-out.

In all the applications, the dyestuffs are suitably employed in a concentration of 0.005–0.2%, preferably 0.05–0.1%, relative to the polyol component.

Using the process according to the invention, polyurethane plastics for a great variety of fields of application are obtained in various colour shades which are distinguished by a very good level of fastness. The rise time, setting time, rise height and foam properties of the polyurethane plastics remain practically unchanged.

EXAMPLE 1

(a) A mixture consisting of 10.0% of the dyestuff of the formula

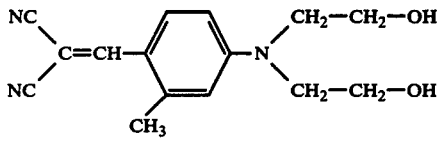

13.5% of butyl benzyl phthalate and 76.5% of a condensation product of adipic acid and 1,2-propylene glycol, having a hydroxyl number of 112–113 and an acid number of 0.31, is homogenised by stirring and is subsequently ground in a continuously operating, commercially available, stirred ball mill, which contains glass spheres of 0.3–0.4 mm diameter as grinding bodies, and of which the shaft, provided with plane circular discs, rotates at a speed of 100 revolutions per minute, until the particle size of the dyestuff is less than 1–2 μm.

To produce a yellow-coloured polyurethane foam, 0.5% by weight of the dyestuff dispersion are fed through a separate metering pump to the mixing chamber of the foaming apparatus according to German Patent Specification No. 901,471. After intensive mixing of the reactants (the recipes for a polyether foam and a polyester foam are described in the paragraphs which follow), a foam of uniform greenish-tinged yellow colour and of uniform pore width is obtained, which is distinguished by very good fastness to light and to bleeding-out.

(b) To produce a polyether foam, 100 g of a customary trifunctional polyether, prepared from trimethylolpropane, propylene oxide and ethylene oxide and having an OH number of 35, 4 g of water, 0.8 g of a polysiloxane-polyalkylene block copolymer as the stabiliser, 0.12 g of triethylenediamine as the catalyst, 0.16 g of tin octoate and toluylene diisocyanate, in an amount stoichiometrically equivalent to the amount of polyether and water employed, are used.

(c) To produce a polyester foam, the following components are employed: 100 g of a polyester prepared from adipic acid and diethylene glycol (OH number 50), 4 g of water, 1.4 g of N-methylmorpholine as the catalyst, 1.5 g of an emulsifier which consists of an adduct of ethylene oxide with a mixture of higher alcohols and has a mean molecular weight of 1,100 and an OH number of 52, 3.8 g of a sulphonated castor oil, 0.2 g of paraffin oil and toluylene diisocyanate in an amount which is stoichiometrically equivalent to the amount of polyester and water employed.

EXAMPLE 2

Dyestuff dispersions are prepared as in Example 1, but replacing the adipic acid/propylene glycol condensation product by a polydipropylene glycol adipate having an OH number of 110–111 and an acid number of 0.2 or by a condensation product of adipic acid and 1,3-butanediol having an OH number of 114 and an acid number of 0.36.

Yellow ether foams and ester foams with excellent fastness properties are obtained with these dyestuff dispersions also.

EXAMPLE 3

(a) A yellow dyestuff paste of 20 g of the dyestuff mentioned in Example 1 and 80 g of a polyether which is obtained by reaction of 1 mol of trimethylolpropane and 3 mols of ethylene oxide and has an OH number of 550, is prepared as follows:

The dyestuff is kneaded in a dispersion kneader with the appropriate amount of the abovementioned polyether to give a viscous kneadable mass (for this purpose, about 0.4 g of polyether is employed per g of dyestuff). After a kneading time of 10 minutes, the mass is very slowly diluted with the remaining amount of polyether, whilst continuing the kneading. A colour paste which is empolyed for colouring rigid polyurethane integral foam is obtained.

(b) 100 g of a polyol mixture having an OH number of 495 and a viscosity of 1,150 cP at 25° C., and consisting of 80 g of a polyether of OH number 550, which was obtained by addition reaction of ethylene oxide with trimethylolpropane, and 20 g of a polyester of OH number 370, which was obtained by reaction of 1 mol of adipic acid, 2.6 mols of phthalic anhydride, 1.3 mols of oleic acid and 6.9 mols of trimethylolpropane, are mixed with 1 g of a polysiloxane/polyalkylene oxide block copolymer as a foam stabiliser, 0.5 g of tetramethylguanidine as a catalyst, 5 g of monofluorotrichloromethane as a blowing agent and 5 g of the dyestuff preparation described above. The mixture is fed to a two-component metering/mixing apparatus and is there mixed intensively with 155 g of a polyisocyanate, which was obtained by phosgenation of aniline-formaldehyde condensates and subsequent reaction with a diol of OH number 480 and has a viscosity of 130 cP at 25° C. and an NCO content of 28% by weight, so as to produce the foaming reaction mixture, which is immediately introduced into a metal mould kept at 60° C. After a pot-life of 7 minutes the yellow-coloured moulding of rigid polyurethane integral foam, having an overall density of 0.6 g/cm$^3$, can be removed from the mould. The mechanical properties ($\epsilon$-modulus, flexural strength, elongation at break, impact strength, heat distortion point and the like) of the coloured moulding have not been worsened compared to those of a non-coloured crude moulding.

EXAMPLE 4

100 g of an ethanediol-butanediol-adipic acid polyester of molecular weight 2,000 (OH number 56) are stirred with a paste of 0.1 g of the dyestuff described in Example 1 and 22 g of 1,4-butanediol and 1.2 g of n-octanol (0.037 mol). 0.3 g of stearylamide and 1 g of stabiliser (2,6,2',6'-tetraisopropyl diphenyl carbodiimide) are also added and the mixture is heated to 90° C. whilst stirring and mixed with equivalent amounts of 4,4'-diphenylmethane diisocyanate (74.6 g) at 60° C., with vigorous stirring. The mixture is then poured onto a metal sheet and the solidified product is granulated and injection moulded.

A polyurethane elastomer moulding of greenish yellow colour is obtained.

EXAMPLE 5

(a) 482.5 g of hexanediol polycarbonate of molecular weight 1,050 are dehydrated at 125° C. and 14 mm Hg, 3.4 g of the dyestuff described in Example 1 are added at 120° C., the mixture is stirred for 10 minutes and allowed to cool to 100° C., 76.0 g of 1,6-diisocyanatohexane are added and the mixture is kept at 100° C. for one hour.

It is then cooled to 60° C., 4.0 g of N-methyldiethanolamine and 169.5 g of acetone are allowed to run in and the whole is kept for 3 hours at 60° C.

After further cooling to 50° C., 3.1 ml of dimethyl sulphate in 400 g of acetone are added and the mixture is stirred for a further 20 minutes.

737 g of a 50% strength prepolymer solution in acetone, having an NCO content of 1.1%, are obtained. 743 g of prepolymer are mixed with 165 g of 1 N propylenediamine solution in water and 578 g of distilled water at 45° C., with good stirring. The acetone is distilled off and the residue is washed with water, sieved through an 0.5 mm sieve, filtered off and dried.

A yellow, readily free-flowing thermoplastic polyurethane powder having a melting point of 135° C. is obtained; this is used for textile coatings.

(b) The powder described above (spherical particles of mean diameter 43$\mu$) is knife-coated onto a release paper, a thickness of 100 g/m$^2$ being applied, and is then exposed to a temperature of 140° C. in a jet-type tunnel of 12 m length, at a belt speed of 1.5 m/min. A tough and elastic sintered material is formed, which can be separated from the carrier without difficulty and can be handled without additional support.

(c) The sintered material produced according to paragraph (b) is again coated with the same powder in a second coating sequence (thickness applied: 60 g/m$^2$) and is subsequently treated at 170° C. in the tunnel, as described in paragraph b. A homogeneous yellow-coloured sheet of total thickness 160 g/m$^2$ is obtained, which has high tensile strength, very good elastic properties and outstanding fastness to light.

(d) The sheets formed in accordance with paragraphs (b) and (c) can be bonded in the conventional manner, by wet lamination on one or both sides, to any desired carrier materials, such as cotton fabrics, polyester fabrics, flowing materials and the like. For wet lamination it is possible to use, for example, polyurethane solutions, polyurethane dispersions or other adhesives. The lamination can, however, also be carried out in accordance with the principle of heat-sealing, by means of thermoplastic plastic powders.

(e) A porous sheet produced according to paragraph (b) is provided with a layer of the polyurethane powder from paragraph (a), (thickness applied 80 g/m$^2$) by knife-coating and is exposed to the action of a temperature of 145° C. Whilst the powder is in the plastic state, a cotton nettle (80 g/m$^2$) is laminated onto it, under pressure. After cooling, the laminate is firmly bonded and withstands more than 1,000,000 folds in the Bally Flexometer.

EXAMPLE 6

800 g of an adipic acid copolyester with 1,6-hexanediol and 2,2-dimethyl-1,3-propanediol in the molar ratio of 65:35 (OH number = 65.9), in which 0.8 g of the dyestuff mentioned in Example 1 has been finely dispersed, are reacted with 15.5 g of N,N-bis-($\beta$-hydroxypropyl)-methylamine and 786 g of a solution of 260 g of diphenylmethane-4,4-diisocyanate in 650 g of dimethylformamide (which after standing for one hour has an NCO content of 9.21%) for one hour at 60° C. and three hours at 70°–80° C. The NCO content of the pre-adduct is then 2.37%, relative to solids.

37.7 g of terephthalic acid bis-m-aminoanilide are stirred into 600 g of the above NCO pre-adduct solution and after 3 hours the mixture is diluted with 20 g of dimethylformamide. After the viscosity has risen further, the mixture is in each case diluted with dimethylformamide, until, after a total of 850 g of dimethylformamide has been added after about 20 hours, a homogeneous elastomer solution with a viscosity of 640 poise at 20° C. is obtained. The inherent viscosity of the elastomer substance, measured in a 1% strength solution in hexamethylphosphoramide at 25° C. is 1.30. 1% of acetic anhydride is added to the solution, which is spun in accordance with the customary dry spinning process, the fibres being pre-stretched by 0 or 30% during winding up, being wound up on bobbins and being thermoset in this state for one hour at 130° C. A further part of the solution is spun in accordance with the wet spinning process.

Wet Spinning Process

A 20% strength elastomer solution is spun at a feed rate of about 1 ml/minute through a spinneret with 20 holes of 0.12 mm diameter into a coagulation bath, at 80°–85° C., which contains 90% by weight of water and 10% by weight of dimethylformamide and is about 3 m long; the product is wound up at a take-off speed of 6 m/minute after passing through a washing zone (water/90° C.). The bobbins are kept in water at 50° C. for 1 hour and are then dried.

Dry Spinning Process

An elastomer solution, preferably of 24–26% strength, is spun through a spinneret with 16 holes of 0.20 mm diameter into a 5 m long tunnel, heated to 220°–250° C., into which air at about 210°–280° C. is blown. The filaments are drawn off at a speed of about 100 m/minute and after treatment with a talc suspension are wound up, for example at a speed of 125–175 m/minute, if appropriate whilst being stretched. The filaments can subsequently be subjected to a heat aftertreatment on bobbins or in a continuous form. Higher spinning speeds, for example 300–400 m/minute, can also be chosen, in which case a subsequent stretching process can be dispensed with.

Yellow highly elastic filaments having very good fastness to light and to wet processing and very good thermal, hydrothermal and mechanical properties are obtained.

EXAMPLE 7

(a) 35 g of the dyestuff described in Example 1 and 65 g of an 8.5% strength solution of a polyester-polyurethane, which was prepared by reaction of a polyester resin of hexanediol and adipic acid, having a mean molecular weight of 800, with 1,4-toluylene diisocyanate, in a 1:1 methyl ethyl glycol/toluene mixture, are ground in a ball mill for 12 hours. The resulting colour paste can be used for pigmenting all commercially available two-component polyester-polyurethane textile coating compositions.

(b) 10 g of the yellow colour paste described in paragraph (a) are slowing stirred into a solution which consists of 30 g of a crosslinkable polyester-polyurethane with terminal OH groups and 70 g of ethyl acetate. After a short time (3 to 5 minutes) a stable dispersion is obtained, which can be used, after addition of a polyisocyanate, prepared by reaction of 1 mol of trimethylolpropane and 3 mols of toluylene diisocyanate and a heavy metal salt as an accelerator, for coating textiles by the reverse coating process or direct coating process. The polyurethane films produced with the final dispersion in accordance with known processes are coloured in an even and speck-free yellow which is fast to light and to solvents.

EXAMPLE 8

0.3%, relative to polyester content, of the dyestuff mentioned in Example 1 is dissolved in a 30% strength solution of a phenol-blocked polyisocyanate containing 12% of NCO and a branched polyester having a hydroxyl number of 12, in the weight ratio of 2:1, in equal parts of cresol, xylene and glycol monomethyl ether acetate. The yellow-coloured lacquer is applied to aluminium foil with the aid of a 100 μm coating roller system and is then stoved for 30 minutes at 180° C.

EXAMPLE 9

In addition to the dyestuff employed in the preceding examples, the dyestuffs of the formula (I) listed in the table which follows can also be employed successfully, in accordance with Examples 1 to 8, for colouring polyurethane plastics in the colour shades indicated:

| No. | $R_1$ | $R_2$ | A | B | Colour shade |
|---|---|---|---|---|---|
| 1 | H | H | $-C_3H_6-$ | $-C_3H_6-$ | greenish-tinged yellow |
| 2 | $CH_3$ | $CH_3$ | $-C_2H_4-$ | $-C_2H_4-$ | greenish-tinged yellow |
| 3 | $OCH_3$ | H | $-C_2H_4-$ | $-C_2H_4-$ | yellow |
| 4 | $OCH_3$ | $OCH_3$ | $-C_4H_8-$ | $-C_4H_8-$ | yellow |
| 5 | Cl | H | $-C_2H_4-$ | $-C_2H_4-$ | greenish-tinged yellow |
| 6 | $CH_3$ | H | $-C_2H_4-$ | $-C_3H_6-$ | greenish-tinged yellow |
| 7 | $OC_2H_5$ | $OC_2H_5$ | $-C_2H_4-$ | $-C_2H_4-$ | yellow |
| 8 | $C_2H_5$ | H | $-C_4H_8-$ | $-C_4H_8-$ | greenish-tinged yellow |

We claim:

1. Colored polyurethane foam of very good light-fastness having incorporated therein with covalent bond formation 0.005 to 0.2% based on the polyol component of a dyestuff of the formula

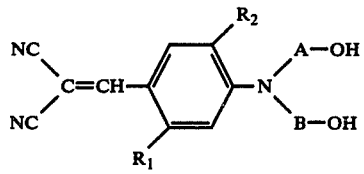

wherein
$R_1$ is hydrogen, methyl, ethyl, methoxy, ethoxy, chlorine, bromine or acetylamino;
$R_2$ is hydrogen, methyl, ethyl, propyl, methoxy or ethoxy and;
A and B are ethylene, trimethylene or tetramethylene.

2. Foam of claim 1 in which
$R_1$ is methyl;
$R_2$ is hydrogen, and
A and B are ethylene.